United States Patent [19]

Andrews

[11] Patent Number: 4,569,847
[45] Date of Patent: Feb. 11, 1986

[54] CHEESE-CONTAINING CONFECTIONERY-LIKE COATING

[75] Inventor: Todd A. Andrews, Palo Alto, Calif.

[73] Assignee: SCM Corporation, New York, N.Y.

[21] Appl. No.: 592,176

[22] Filed: Mar. 22, 1984

Related U.S. Application Data

[63] Continuation-in-part of Ser. No. 402,845, Jul. 29, 1982, abandoned.

[51] Int. Cl.[4] .................. A23G 3/00; A23C 19/09; A21D 15/08
[52] U.S. Cl. .................................. 426/94; 426/99; 426/582; 426/583; 426/607; 426/613; 426/302; 426/307; 426/660; 426/658
[58] Field of Search ............... 426/613, 659, 606, 582, 426/589, 660, 103, 607, 302, 307, 658

[56] References Cited

U.S. PATENT DOCUMENTS

| | | | |
|---|---|---|---|
| 2,168,360 | 8/1939 | Musher | 99/1 |
| 2,222,560 | 11/1940 | Clickner | 99/134 |
| 2,999,023 | 9/1961 | Babayan | 426/660 |
| 3,044,883 | 7/1962 | Ferguson | 426/613 |
| 3,199,984 | 8/1965 | Jensen et al. | 426/306 |
| 3,431,112 | 3/1969 | Durst | 99/1 |
| 3,652,299 | 3/1972 | Penton | 99/144 |
| 3,814,825 | 6/1974 | Gilmartin et al. | 426/361 |
| 3,843,808 | 10/1974 | Ziccarelli | 426/582 |
| 3,857,977 | 12/1974 | Huessy | 426/189 |
| 3,966,993 | 6/1976 | Luck | 426/589 |
| 4,198,439 | 4/1980 | Hoover | 426/632 |
| 4,251,551 | 2/1981 | Van Hulle | 426/613 |
| 4,296,141 | 10/1981 | de Paolis | 426/613 |

Primary Examiner—Jeanette M. Hunter
Attorney, Agent, or Firm—Richard H. Thomas

[57] ABSTRACT

The present invention resides in a hard, glossy, confection-like coating which has the flavor and texture of a hard cheese, but which is capable of being stored under ambient conditions, the coating comprising: a flavoring amount, preferably about 30–37%, cheese powder; a hard butter in sufficient amount, preferably about 35–40%, to form a continuous matrix, the hard butter having a Wiley Melting Point in the range of about 84°–120° F., and an approximate solid-fat index of more than about 40 at 80° F. and less than about 35 at 92° F.; and about 0.4–0.8% lecithin; the remainder being essentially cheese related filler; said coating having a moisture content of less than about 3½%.

20 Claims, No Drawings

CHEESE-CONTAINING CONFECTIONERY-LIKE COATING

This is a continuation-in-part of application Ser. No. 402,845, filed July 29, 1982, abandoned.

The present invention relates to cheese-flavored, hard, confection-like coatings which are ambient stable. By ambient stable, it is meant that the coatings, which contain a flavoring amount of cheese powder, can be stored for prolonged periods, under ambient conditions, without refrigeration and without spoiling or degradation of the cheese powder.

An advantage of the present invention is that the coatings can be made using conventional confectionery equipment and knowledge. The coatings have outstanding flavor, appearance, and nutritional value, and can be applied to a variety of substrates.

BACKGROUND OF THE PRESENT INVENTION

Prior U.S. Pat. No. 2,222,560 to Clickner describes a cheese-flavored coating which comprises spray dried cheese powder and a fat such as refined coconut oil or hydrogenated coconut, cottonseed, sesame, or corn oil. The coating may comprise 15–20% cheese powder, and is said to be substantially solid at room temperature, having a consistency similar to butter but can be readily applied to popcorn or the like by melting and then pouring or spraying. The composition does not produce a hard coating having the smooth, firm texture of a hard cheese. U.S. Pat. No. 3,431,112 to Durst, describes a food bar which contains a binder of a normally solid fat or oil encapsulated with a film-former such as non-fat milk solids, sodium caseinate, soy protein and others, referred to as hydrophilic colloids, and particulate. Cheese particles are listed as one of a number of alternative particulate foods. No example is given in the patent using cheese particles. A typical product of the patent may contain about 15 parts non-fat milk solids, about 15 parts lard flakes, and about 19 parts sucrose, the particulate food being a blend of corn flakes and wheat flakes dispersed in the binder in a ratio of about 52% particles and 45% binder.

Hoover U.S. Pat. No. 4,198,439 describes a cheese product composed of a blend of ground roasted nuts, a texture modifying fat and dehydrated cheese (which may be spray dried cheese powder), the product having a water activity below about 0.7%. The product is said to be suitable as a spread for snacks and can be stored for extended periods without refrigeration. An emulsifier such as mono- and diglyceride or lecithin may be added to stabilize the product. The texture-modifying fat is a non-hydrogenated fat in combination with hydrogenated fat, glycerides and mixtures thereof, and has a Capillary Melting Point of more than 120° F. In preparing the product, the lipids, in an amount of about 5–15% of the final product, are first melted, and the nuts, in an amount of about 50–80%, and cheese powder in an amount of about 10–40%, are then added and blended into the lipids, in that order. No reference is made in the patent to confectionery properties of the product.

Prior U.S. Pat. No. 2,168,360 to Musher, describes a fat-containing food composition which can be added to water and cooked to make a product such as gravy. The food composition comprises essentially a hard fat and a water-absorbent bodying material such as cornstarch, tapioca, gum arabic, gelatin and pectin. Spices, condiments and the like, can be intimately admixed with these ingredients. The composition is intended for addition to water or an aqueous medium to make a final product, and would not be suitable as a confection-like coating.

U.S. Pat. No. 3,652,299 to Penton describes a concentrate product which is said to be a rigid or brittle solid at room temperature and which contains a fat, oil or hard butter, emulsifier, and starch material, such as potato starch, arrowroot starch, wheat starch or rice starch. The product of this patent also contains sauce flavoring materials desired to impart a characteristic flavor, such as milk solids, cheese, dehydrated onion chips, dehydrated mushrooms, pimiento, and others. Although principal applications for the concentrate product appear to be such foods as sauces, soups and gravies, prepared by addition to water, it is indicated in the patent that the concentrate of the patent, in a hot, viscous form, can be applied to a food item by spraying, for instance, onto dehydrated potato slices passing on a belt conveyer. On cooling, it is indicated that the concentrate forms a hard coating over the slices which then may be packaged in a suitable container. Even here, the intended ultimate application, such as escalloped or augratin potatoes, is intended to be cooked from a frozen state. There is no mention of forming a confection-like coating for consumption in the marketed state, and the concentrate product of this patent would not be suitable for the preparation of confection-like coatings.

U.S. Pat. No. 3,814,825 to Gilmartin et al describes a synthetic, chunked cheese-flavored product said to be suitable for use on salad dressings, dips, dehydrated foods and sauces. The product comprises finely comminuted cheese-flavored dry material admixed into a molten blend of hard and soft fats.

U.S. Pat. No. 3,857,977 to Huessy describes the formulation of edible food flavoring cubes or pellets for incorporation into dry food systems, wherein the cubes have a wheat flour, soy flour, and dry buttermilk base. Whey may also be present as a flavoring ingredient. The dry bulk ingredients are thoroughly mixed together and a fat phase, such as hydrogenated vegetable oil, is added. A water phase is then added and mixing is continued until homogeneous. The mix is extruded through a heated die and cut into pellets. The vegetable oil functions primarily to provide lubrication during the extrusion step.

Luck U.S. Pat. No. 3,966,993 assigned to assignee of the present application, describes a sauce or gravy bar adapted to be melted and mixed with water to produce a sauce or gravy for use. The sauce or gravy bars are prepared, in part, by mixing fat, flour and condiment solids together, tempering the mixture, forming the tempered mixture into a solid bar under conditions precluding complete remelting of the fat crystals, and cooling the bar to room temperature. Here again, the product would be unsuitable for the preparation of a confection-like coating.

SUMMARY OF THE PRESENT INVENTION

The present invention resides in a hard, cheese-colored, confection-like coating which has the flavor, appearance and texture of a hard cheese but which is capable of being stored under ambient conditions, the coating comprising on a weight basis; a flavoring amount of about 10–60%, preferably about 30–37%, of a dried cheese powder; and added hard butter in sufficient amount of about 20–60%, preferably about 35–40%, to form a continuous matrix; the hard butter having a Wiley Melting Point in the range of about 84°–120° F., and an approximate solid-fat index of more than about 40 at 80° F. and less than about 35 at 92° F.; and about 0.4–0.8% lecithin; the remainder being essentially cheese related filler; said coating having a moisture content of less than about 3½%.

The cheese powders preferably spray dried and may have a butterfat content of about 0–46%, preferably about 20–46%. They may also be dried in other ways, for instance by drum drying or pan drying.

For purposes of the present application, the term "coating" means a covering having discernable or visible thickness, as measured by the naked eye, as compared to a thin film. In order to have a cheese color or appearance, even a dull cheese color, the coating must have opacity, and the coatings of the present invention have sufficient thickness to be opaque and to provide such color or appearance.

The term "glossy" is applicable to the appearance of most hard cheeses. Even a hard cheese which may be characterized as dull has a definite gloss factor, as contrasted with an article which is flat.

In this application, percentages are by weight, dry basis, unless otherwise specified.

In an embodiment of the present invention, a minor but effective amount of a gloss forming emulsifier which also is viscosity increasing at enrobing or application temperature, such as sorbitan monostearate, polysorbate 60, or blend thereof, may be employed in the coating formulation.

Preferably, the coating formulations of the present invention are prepared using standard confectionery technology involving subjecting the mixture of ingredients to refining and then conching the mixture at an elevated temperature, under conching conditions, for a prolonged period of time. The coatings are applied to a substrate by any of a number of procedures, for instance spraying, and are then cooled in a cooling tunnel, again, preferably using conventional or generally conventional confectionery procedures.

The coatings of the present invention, in addition to having a good flavor balance, also have good gloss and are free from speckling, similar to a confectionery coating, the texture and flavor, however, being that of a hard cheese. The coatings are capable of being applied to a variety of substrates, for instance chips such as corn chips, crackers, biscuits, meat centers such as Braunschweiger, textured vegetable proteins, and to other substrates. The cheese coatings may come in a variety of flavors, for instance Swiss, Cheddar, aged Cheddar, and American.

DETAILED DESCRIPTION OF THE PRESENT INVENTION

The present invention, in essence, is based on the discovery that cheese powder, which normally is spray dried cheese, can be reconstituted with a hard butter to produce a product which has similar properties to a natural hard cheese, including flavor, appearance, and texture, but which at the same time is ambient stable. The present invention is also based on the discovery that the same coverture properties of a conventional confectionery coating can be obtained, even with a high butterfat content imparted by a relatively large amount of cheese particles. Critical aspects of the present invention lie in the composition, proportions and method of preparation of the coating.

Concerning the amount of cheese particles, a high flavor profile is critical to reduce the amount of coating required, the coatings being relatively expensive. For purposes of the present application, a flavoring amount of cheese particles is broadly about 10–60% preferably about 25–40%, more preferably about 30–37%, based on the total weight of the coating formulation.

To be ambient stable, the products of the present invention should have a moisture content less than about 3.5%. The spray dried cheese powders and cheese related filler usually have a maximum moisture content of about 4%, typically less than 3%. Dilution of these ingredients by other components of the formulation brings the product moisture content below the 3.5% level. Use of a matrix forming amount of hard butter resists moisture pickup and increase above this level and loss of ambient stability.

The cheese powders of the present invention normally have a gritty texture. Use of a hard butter in a sufficient amount to form a continuous matrix and completely enrobe the cheese particles also serves to mask this grittiness and obtain the smooth texture and appearance of a hard cheese.

A matrix forming amount of hard butter is broadly in the range of about 20–60%, but preferably will be in the range of about 35–40%, based on the total weight of the coating formulation. The exact amount of hard butter used depends upon the properties desired in the final coating, and properties of the hard butter used. Generally, the higher the hard butter content, the lower the viscosity of the coating. A higher hard butter content also gives more hardness and gloss in the final product, and a smoother texture.

Complete wetting of the cheese particles by the hard butter continuous phase is critical and is accomplished by adding to the coating formulations of the present invention an amount of viscosity reducing lecithin, and subjecting the coating formulations to generally conventional confectionery processing techniques, including refining and conching. The formulations of the present invention are then applied to a substrate from a melted state.

After application to a substrate, the products (substrate and coating) are subjected to cooling in a cooling tunnel using conventional or generally conventional confectionery cooling procedures. Use of conventional confectionery processing techniques also is an important factor towards obtaining the smooth texture and appearance of a hard cheese, referred to above.

The remainder of the coatings (about 25–40%) of the present invention (not including small amounts, if any, of emulsifier and flavorants, such as salt and pepper) consists essentially of cheese-related powder fill compatible with the cheese particles. By compatible, it is meant that such fill complements the flavor of the cheese particles, or is bland in flavor; and that the fill is capable of blending with the cheese particles and when so blended resist agglomeration of cheese particles and make uniform dispersion of the cheese particles into the hard butter matrix possible. By way of example, suitable such fillers are non-fat dry milk, buttermilk solids, demineralized whey solids, lactose, fructose, sucrose, and blends thereof. Others will be apparent to those skilled in the art. The lactose, fructose, sucrose and even the whey solids add some sweetness to the formulation, which may or may not be desirable. It was found that buttermilk solids, making up a portion of the coating formulation, provided with the cheese powders, the best cheese flavor.

The fill component or components should be comprised of inert particles capable of being non-gritty in the lipid phase, either rendered so by conventional confectionery refining techniques or by separate particle size reduction of the fill ingredients and adding the ground particulates to the lipid phase. For this purpose, a principal requirement of the fill is that it be friable, having a friability factor approximately equivalent to that of sugar. Attrition of the fill particles can be carried out in a number of ways, for instance, in a hammer mill, a ball mill, or a roll mill. It also may be desirable, for optimum control of properties of the finished product, that the fill particles be substantially free of fat which would function as a diluent of the lipid phase. The fill particles, as mentioned, preferably are bland in taste, to avoid masking or adversely affecting the cheese flavor which is added. The particles are preferably non-hygroscopic, equivalent in this regard, as well, to sugar, to avoid water pickup prior to processing. Water can adversely affect processing during refining, and/or conching, causing undesired agglomeration, as is well known in confectionery practice.

Those particles which are bland in taste and at the same time have a high degree of friability and non-hygroscopicity approximating that of sugar, are disaccharides, such as the aforementioned lactose or whey. Whey is very high in lactose content. The whey can be demineralized whey or sweat dairy whey. Sweet dairy whey has a slight saltiness, which may be advantageous or disadvantageous, depending upon the cheese dominant flavor.

The fill particles of this invention can also include friable, dairy-derived food additives such as non-fat dry milk and non-fat buttermilk solids, both well known ingredients in confectionery formulations. Another useful fill ingredient is a protein, one that is bland in flavor, such as defatted soy protein. A friable protein such as a caseinate can also be used. The protein provides nutrition and also a desired astringency. A textured vegetable protein can be used. Another category of ingredients that can be used is a bland, hydrolyzed, non-hygroscopic, friable starch, such as a low DE corn syrup solid, preferably having a dextrose equivalent less than about 15, e.g., maltodextrin.

Many other fill ingredients will be apparent to those skilled in the art, and many will be developed in the future since this is an area of rapidly developing technology. The present invention is not limited to specific fill ingredients. It is necessary only that they be bland or complementary in flavor with the cheese particles, that they are friable and non-hygroscopic. Preferably, they have a low fat content for reasons given. By being friable, they blend with the cheese particles and resist agglomeration of the same.

It is understood that the language "consists essentially of" is in reference only to the principal functional ingredients of the coating formulations of the present invention. The addition of such non-functional ingredients as nut solids or flour chili powders, onion powders, green bell pepper powder, and spices such as cinnamon and almond paste are within the scope of the present invention.

HARD BUTTERS AND LIPID PHASE

In the practice of the present invention, the hard butter can be any of a large number of confectionery hard butters in the marketplace. Preferably, they have a Wiley Melting Point in the range of about 84°–120° F., as determined by AOCS method Cc2-38, and an approximate solid fat index, as determined by AOCS method Cd10-57, of

| Temperature °F. | Approx. Solid Fat Index |
| --- | --- |
| 80 | more than about 40 |
| 92 | less than about 35 |

A preferred hard butter, useful in the composition of the present invention, is Kaomel (trademark SCM Corporation), having a Wiley Melting Point in the range of about 97°–101° F., an IV of about 59, and a solid-fat index as follows:

| Temperature °F. | Approx. Solid Fat Index |
| --- | --- |
| 50 | 69 min. |
| 70 | 59 min. |
| 80 | 52 min. |
| 92 | 22 min. |
| 100 | 5 max. |
| 110 | 0 |

This hard butter is derived from a blend of hydrogenated soybean and cottonseed oil, as defined in U.S. Pat. No. 2,972,541 by Cochrane et al, assigned to assignee of the present application.

An advantage in the use of a non-lauric hard butter such as Kaomel is that it has a fairly steep Solids Fat Index slope at temperatures between 92° F. and 100° F., giving the product of the present invention a slightly chewy, slow-release sensation, characteristic of a hard cheese. To achieve this sensation, the hard butter preferably has a solids content at 92° F. of at least about 15 (but no more than 25), at 100° F. of less than 10, and 110° F., less than 2.

Another suitable hard butter useful in the coating composition of the present invention is a lauric hard butter marketed by SCM Corporation under the trademark Satina AB, having a Wiley Melting Point of about 92° F. and a solid fat index of

| Temperature °F. | Approx. Solid Fat Index |
| --- | --- |
| 50 | 73 |
| 70 | 67 |
| 80 | 55 |
| 92 | 0 |

Hydrogenated palm kernel oil may also be used in the composition of the present invention, having a Wiley Melting Point of 95°–111° F. This fat may also be used in a blend with an edible diluting oil, as described below.

Still another suitable hard butter useful in the coating composition of the present invention is Choco-mate (trademark SCM Corporation), having a Wiley Melting Point of about 102° F. and a solid fat index of

| Temperature °F. | Approx. Solid Fat Index |
| --- | --- |
| 50 | 78 |
| 80 | 74 |
| 92 | 33 |

| Temperature °F. | Approx. Solid Fat Index |
|---|---|
| 100 | 1 |

It may be desirable to blend a liquid diluting oil with the above hard butter, to provide better wettability of the cheese particles. The oil should have oxidative stability. One suitable such oil is Durkex 100 (trademark, SCM Corporation), a partially hydrogenated soybean oil having a Wiley Melting Point of about 65° F., and an AOM of 90 hours minimum. This oil may be blended with the Kaomel up to about 40%, based on total lipid content. Another suitable such oil is Durkex 500 (trademark, SCM Corporation), a partially hydrogenated vegetable oil having a WMP of 73° F. and an AOM of 350 hours minimum.

Another hard butter blend, useful in the practice of the present invention, is a blend of 75% Kaomel and 25% 100°–102° cottonseed oil. This blend has a Wiley Melting Point of about 99°–103° F., about 20% minimum SFI at 92° F., 51% minimum at 70° F., and 61% minimum at 50° F., and has been successfully employed with gloss-forming emulsifiers, specifically a combination of sorbitan monostearate (1.57%) and polysorbate 60 (1.05%). Such emulsifiers in combination with hard butters for obtaining gloss are well known in the confectionery art. However, other gloss-forming emulsifiers may be employed in accordance with the concepts of the present invention. An advantage of such emulsifiers is that they increase the viscosity of the coating at application temperature for better control of coverture of the substrate to which the coatings are applied.

Examples of other gloss forming emulsifiers which also have the affect of increasing viscosity are: polyoxyalkylene derivatives of partial glycerides of higher fatty acids, other sorbitol and sorbitan esters of higher fatty acids, other polyoxyalkylene derivatives of sorbitol and sorbitan esters of higher fatty acids, polyglycerol esters of higher fatty acids, and polyoxyalkylene derivatives of polyglycerol esters of higher fatty acids. For present purposes isomers of sorbitol (e.g., mannitol, etc.) are included too. Higher fatty acids are $C_8$ and higher fat forming acids (e.g., up to $C_{22}$–$C_{28}$) and typically are $C_{12}$–$C_{18}$ fat forming acids. Specific lipoidal emulsifiers include, for example, sorbitan tristearate, ethoxylated monoglycerides and diglycerides, ethoxylated sorbitan esters of higher fatty acids (e.g. polysorbate 65, 80, etc.), higher fatty acids of polyglycerol (from about 3 to 10 glycerol units and preferably about 8) and their polyoxyalkylene derivatives, and the like.

CHEESE POWDERS

There are many brands of cheese powders on the market that may be employed in the practice of the present invention. These may be employed alone or as blends, or in combination with cheese flavors (which are powders with other ingredients). The cheese powders are dehydrated cheese, usually spray dried powders, and have a relatively high butterfat content of, for instance, about 20–46%. They are available in a number of different flavors, for instance, Swiss, Cheddar, aged or unaged, and, perhaps, colored or uncolored. Preferably the cheese powders are marketed with a moisture content of less than about 10%, preferably less than about 5%. The following Table 1 is a list of representative Swiss and Cheddar cheese powders and flavors successfully employed in the practice of the present invention:

TABLE 1

| CHEESE POWDERS | | | | |
|---|---|---|---|---|
| Trademark | Flavor | Min. Fat Content | Moisture Content Max. | Ingredient Declaration |
| Beatreme 1326 | Aged Cheddar | 46% | 3.5% | Cheddar cheese solids/sodium phosphate |
| Beatreme 1412 | Mild Cheddar | 46% | 3.5% | Manufactured from uncolored non-aged Cheddar cheese. |
| Cheztone 100 | Cheddar | 32% | 4.0% | Cheddar cheese solids, cultured non-fat milk solids, whey solids, hydrogenated shortening, salt, sodium phosphate; |
| Cheztone 101 | Cheddar | 32% | 4.0% | same as Cheztone 100 but with coloring. |
| Beatone 101 | Cheddar (high flavor powder) | 46% | 3.5% | Cheddar cheese solids |
| Beatreme 1923 | Typical Swiss | 39% | 3.5% | Swiss cheese solids/sodium phosphate |
| Beatone 700 | Swiss flavor | 20% | 4.0% | Enzyme modified swiss cheese solids, non-fat milk solids, sodium citrate. |
| Cheztone 700 | Swiss | 20% | 4.0% | Swiss cheese solids, cultured non-fat milk solids, sodium phosphate. |

The cheese powders and flavors of Table 1 are marketed by Beatrice Foods Co. In addition to the cheese powders of Table 1, the following have also been used:

TABLE 2

| | |
|---|---|
| Borden Co. #3653 | Cheddar cheese, hydrogenated vegetable oil, buttermilk solids, salt, sodium phosphate, sodium hexametaphosphate, citric acid, lactic acid, and artificial color. |
| Nutritek 250 (Foremost Foods) | Whole milk cheese whey with 25% of the mineral salts removed. |
| Borden Co. Cheese Zest 13653 | |
| Borden Co. #90 | Cheddar cheese, hydrogenated vegetable oil, condensed buttermilk, sodium chloride, disodium phosphate, sodium hexametaphosphate, citric acid, lactic acid, artificial color. |
| Borden Co. #87 | Swiss cheese flavoring powder - alternative to Cheztone 700 |

The following blends of cheese powders were used to give different flavors. The proportions given in Table 3 are based on the total composition weight of the coatings in which the cheese powders were incorporated.

TABLE 3

| CHEESE POWDER BLEND | |
|---|---|
| low strength Swiss cheese flavor | 23% Beatreme 1923A |
| | 6% Borden #81 |
| medium strength Swiss cheese flavor | 24.5% Beatreme 1923A |
| | 8% Borden #87 |
| high strength Swiss cheese flavor | 27% Beatreme 1923A |
| | 10% Borden #87 |

TABLE 3-continued
CHEESE POWDER BLEND

| | | |
|---|---|---|
| medium strength Cheddar cheese flavor | 22% | Beatreme 1326 |
| | 2.5% | Cheztone 101 |
| | 8% | Borden #90 |
| high strength Cheddar cheese flavor | 24% | Beatreme 1326 |
| | 5% | Cheztone 101 |
| | 8% | Borden #90 |
| medium strength American cheese flavor | 32.5% | Beatreme 1412 |

OTHER INGREDIENTS

In addition to the above ingredients, the coating formulations of the present invention include minor amounts of such flavorants as salt and pepper, and also, desirably, an amount of an emulsifier. A particularly preferred emulsifier useful in the present invention is lecithin, which eliminates the dryness inherent in the use of the cheese powders. About 0.4 to about 0.8% lecithin, based on the total formulation weight, is effective in eliminating the dryness sensation. In this regard, the lecithin reduces the coating formulation viscosity during processing and causes the fat content to completely encapsulate and cover or wet the surface of the cheese powders.

Above reference was made to the use of certain confectionery type emulsifiers such as propylene glycol monostearate, polysorbate 60, and blends thereof. These emulsifiers tend to increase the viscosity of the coating at application temperatures, which may be advantageous as mentioned, in obtaining better coverture on a substrate. These emulsifiers also enhance gloss and provide bloom resistance.

SUBSTRATES

Many different substrates have been coated or enrobed in accordance with the concepts of the present invention, for instance corn chips, smoked braunschweiger, peanut butter food sticks, saltines, Escort crackers, Ry-Crisp crackers, bread sticks, pretzels and croutons. In all instances, the cheese coatings complemented the substrates and provided an article with a good appearance, good flavor balance, a highly desirable texture and good storage stability, either refrigerated or unrefrigerated, depending upon the substrate. In this latter regard, for meat substrates, refrigeration storage may be necessary.

The amount of coverture on the substrates was dependent on a number of factors; the flavor intensity desired, porosity of the substrate, flow characteristics of the coating, shape of the substrate, and other factors. Broadly, the coverture can range from about 10% to 70%, depending upon the above factors. The coatings are expensive, so that the least amount of covering possible, while still providing the flavor balance or intensity and texture desired, is preferred.

One suitable substrate in accordance with the concepts of the present invention is textured vegetable protein particles, for instance those flavored and shaped to resemble meat particulates. When the same are coated with the coating formulations of the present invention, they offer nutritious, flavorful products which are totally ambient stable.

PREPARATION OF THE COATINGS

In the practice of the present invention, the lipids are first premelted to a liquid and then added to a dry mix of the other ingredients, the mixing of the lipids and other ingredients being carried out until a very thick homogeneous paste is obtained. The mixture is then milled through a refiner to eliminate graininess, and then, employing conventional confectionery techniques, is conched at an elevated temperature; for instance, about 130° F., in a mixer, for a period of time, for instance up to about 12 hours. Following conching, the coatings may be placed in molds and cooled to 55° F. until ready for use, or can be at that point applied to a substrate. Application is carried out at an elevated temperature, for instance, about 105° to about 120° F., depending upon the type of applicator employed. For instance, with a spray applicator, the higher temperature of about 120° F. may be desirable. Following application, to coated products are passed through a cooling tunnel, again using conventional confectionery techniques, and cooled to about 50°–65° F. in a short period of time, about 5 minutes.

Application of the coatings to a substrate can be carried out by a number of different procedures or use of different applicators other than a spray device, for instance, by brush, dipping, or the like.

In the above, an advantage of the present invention is the ability to use conventional confectionery processing equipment.

By the confectionery procedures employed, coatings which have a glossy surface or appearance similar to that obtained with conventional confectionery coatings, and with natural cheese, are obtained. The coatings are resistant to moisture pickup, and thus are ambient stable. When applied to a substrate, they are in a convenient form for consumption and offer nutritional value.

EXAMPLE 1

In this example, corn chips were coated on one side with the following formulation. The coatings were applied with a hand sprayer at approximately 120° F.

| | Percent |
|---|---|
| Hydrogenated vegetable fat, WMP 97–101° F., Kaomel (trademark, SCM Corp.) | 30.6 |
| Partially hydrogenated vegetable oil, WMP 73° F. Durkex 500 (trademark, SCM Corp.) | 3.4 |
| Lecithin | 0.4 |
| Beatreme 1923 Swiss cheese powder | 24.5 |
| Borden's #87 Swiss cheese flavoring powder | 8.0 |
| Non-Fat dry milk | 9 |
| Lactose | 15. |
| Demineralized cheese whey solids (25% ash content removed) | 9. |
| Salt | .1 |
| White pepper | trace |

This coating gave a medium strength Swiss cheese flavor, and had good melt and consistency characteristics.

To prepare the coating, the fat system was melted to a liquid and added to a dry mix of the other ingredients. The resultant mix was hand-mixed to a paste and then mixed on a Hobart mixer (T-100, trademark) at a #3 speed, until very thick.

This mix was then milled through a refiner to eliminate graininess and conched at 130° F. in a T-100 Hobart mixer, at a #1 speed, for about 12 hours.

The coatings were then applied to the corn chips at about 120° F. (as indicated) and cooled in a cooling tunnel at about 50° F.

EXAMPLE 2

The following formulation was prepared as in Example 1 and was applied in two applications to the surface of smoked braunschweiger.

|  | Percent |
| --- | --- |
| Hydrogenated vegetable fat, WMP 97-101° F., Kaomel (trademark, SCM Corp.) | 30.2 |
| Partially hydrogenated vegetable oil, WMP 73° F., Durkex 500 (trademark, SCM Corp.) | 3.4 |
| Lecithin | 0.4 |
| Beatreme 1923A Swiss cheese powder | 27. |
| Borden's #87 Swiss cheese flavoring powder | 10. |
| Non-fat dry milk | 8. |
| Lactose | 13.5 |
| Demineralized whey (of Example 1) | 7. |
| Salt | 0.1 |
| White pepper | trace |

The dual coating had a high strength Swiss cheese flavor, gave good flavor balance, and made a highly desirable product with outstanding texture and refrigerated storage stability. The coatings were processed and applied as in Example 1.

The slightly higher level of lecithin than in Example 1 provided better texture (less dryness).

Both Examples 1 and 2 formulations contained less than 3½% moisture, making ambient storage of the products possible. Since the substrate in Example 2 was meat, refrigerated storage of this product was necessary. The coatings of both Examples 1 and 2 had the gloss appearance of a confectionery coating or cheese, but the texture of hard cheese, such as Swiss or Cheddar.

EXAMPLE 3

The following formulation was used to enrobe peanut butter food sticks, saltines and Escort crackers.

|  | Percent |
| --- | --- |
| Hydrogenated vegetable fat, WMP 97-101° F., Kaomel (trademark, SCM Corp.) | 30.2 |
| Partially hydrogenated vegetable oil, WMP 73° F., Durkex 500 (trademark, SCM Corp.) | 3.4 |
| Lecithin | 0.8 |
| Demineralized whey (of Example 1) | 9. |
| Lactose | 15. |
| Salt | .1 |
| White pepper | trace |
| Beatreme 1326 (Cheddar) | 22. |
| Borden's #90 Cheddar cheese flavoring powder | 8. |
| Cheztone 101 (Cheddar) | 2.5 |

The formulation gave a medium cheddar cheese flavor. By controlling the amount of refining, the particle size of particulate in the coating composition and apparent viscosity of the composition (°MacMichael) may be varied. The formulation was adjusted to have an apparent viscosity (°MacMichael) at 120° F. in the range of 40°–55°, with the particle size varying from 40 maximum (5–20 average) to 100 maximum (20–30 average), respectively.

Medium viscosity samples (e.g., 40 MacMichael at 120° F.) appeared to be most suitable for application to crackers. At the 102° F., application temperature, such formulation had about a 50° MacMichael viscosity.

In general, the coatings of the present invention preferably are refined to have a particle size in the range of about 30 maximum (5–15 average) to about 100 maximum (20–30 average); and MacMichael viscosities in the range of about 20°–150° at 102°–105° F.

EXAMPLE 4

The following Cheddar formulation was successfully applied to a variety of substrates; croutons, pretzels, bread sticks, and Rye-Krisp. The coatings were applied at a 105° F. enrobing temperature and then cooled in a 5 minute, 57°–60° F. cooling tunnel. All of the coating had good appearance. The enrobed croutons had a particularly good flavor balance. The products were all about 67% coating by weight, partly due to absorption by the substrate and the substrate low specific gravity.

|  | Percent |
| --- | --- |
| Hydrogenated vegetable fat, WMP 97-101° F., Kaomel (trademark, SCM Corp.) | 27.00 |
| 100-102° hydrogenated cottonseed oil | 9. |
| Sorbitan monostearate | 0.6 |
| Polysorbate 60 | 0.4 |
| Lecithin | 0.4 |
| Cheztone 101 (cheddar) | 2.5 |
| Beatreme 1326 (cheddar) | 22. |
| Borden's #90 (cheddar) | 8. |
| Non-fat dry milk | 7. |
| Lactose | 10. |
| Demineralized whey solids (of Example 1) | 9. |
| Salt | 0.1 |
| White pepper | trace |
| Sucrose | 4. |

This product gave a medium strength Cheddar cheese flavor. In this example, the fat composition was slightly different from that in Examples 1–3. Specifically, the Kaomel hard butter was employed in combination with a 100°–102° cottonseed oil present in the amount of about 9%. In addition, viscosity increasing emulsifiers, sorbitan monostearate and polysorbate 60 were employed, providing an excellent product for application to a farinaceous substrate. Following refining, the product had a maximum particle size of about 55 microns, with an average particle size of 15–30 microns, and an apparent MacMichael viscosity at 120° F. of 33.75°, and at 105° F. of 42.5°. The coatings had good gloss and exhibited no speckling. Hardness, as determined by PCL procedure 0050 was 1.91. The coatings had a moderately strong flavor and good melt-away (lack of waxiness in the taste).

For application to the substrates, the coatings were cooled to 105° F.

A similar Swiss cheese formulation was applied to the same substrates, except that the cheese powders were as follows:

| Beatreme 1923A | 24.5 |
| --- | --- |
| Cheztone 700 | 8.0 |

A similar American cheese formulation contained Beatreme 1412 at a level of 32.5%.

In all of the formulations, gloss was good and none exhibited any speckling.

What is claimed is:

1. A conched, hard, glossy, non-grainy, cheese-flavored, confection-like coating having the flavor and texture of a hard cheese but being capable of storage under ambient conditions, consisting essentially of, on a dry basis;

a flavoring amount of about 10–60% dried cheese powders;

about 20–60% of a hard butter matrix having a Wiley Melting Point in the range of about 84°–120° F., as determined by AOCS method Cc2-38 and an approximate solid fat index, as determined by AOCS method Cd10-57 of more than about 40 at 80° F. and less than about 35 at 92° F.;

about 0–0.8% lecithin;

an effective amount of a gloss-forming emulsifier;

the remainder being particulate filler, said coating having a moisture content of less than about 3.5%;

said cheese powders and particulate filler being uniformly dispersed in the hard butter matrix;

said particulate filler being a carbodyhydrate, a protein, or combination thereof; said carbohydrate being selected from the group consisting of monosaccharide, disaccharide, and hydrolyzed starch; said protein being selected from the group consisting of dry milk, vegetable protein and caseinate.

2. The coating of claim 1 wherein said cheese powders contain about 20–46% by weight butterfat and are spray dried with a moisture content less than about 4%.

3. A coated food product comprising an edible substrate and the coating of any of claims 1 or 2.

4. The food product of claim 3 wherein the substrate is a farinaceous material.

5. The coating of claims 1, or 2 having a MacMichael viscosity at 102°–105° F. of about 20°–150°.

6. The coating of claim 2 containing about 0.4–0.8% lecithin.

7. A process for preparing the coating of claim 1 or 2, comprising the steps of:

melting the lipid ingredients, forming a mixture of the dry ingredients, blending the lipids and dry ingredients to form a mixture thereof;

milling the resultant lipid and dry ingredient mixture and;

conching said lipid mixture until the texture of hard cheese is obtained.

8. The coating of claim 1 wherein said hard butter is non-lauric and has a solids content at 92° F. in the range of about 15–25, at 100° F. less than about 10, and at 110° F. less than about 2.

9. A refined and conched cheese flavored confection composition capable of forming a confectionery unit and coating comprising on a weight basis about 10–60% powdered dry cheese;

about 25–40% of a friable, particulate carbohydrate and/or protein filler, said carbohydrate being selected from the group consisting of monosaccharide, disaccharide and hydrolyzed starch; said protein being selected from the group consisting of dry milk vegetable protein, and caseinate;

about 20–60% of a fat which has a Wiley Melting Point in the range of about 84°–120° F., as determined by AOCS method Cc2-38, an approximate solid fat index, as determined by AOCS method Cd10-57 of more than about 40 at 80° F. and less than about 35 at 92° F.;

said powdered dry cheese and fat being refined and conched simultaneously to break down said cheese particles while forcibly coating said cheese particles with said fat.

10. The cheese flavored confection composition of claim 9 which further comprises lecithin.

11. The cheese flavored confection composition of claim 9 wherein said powdered dry cheese comprises aged cheese solids and a maximum moisture content of about 5%.

12. The cheese flavored confection composition of claim 9 wherein said filler is non-fat dry milk.

13. The cheese-flavored confection composition of claim 9 wherein said powdered dry cheese is present in an amount of from about 30 to about 37% by weight, said particulate filler is present in an amount of from about 25 to about 40% by weight, and said fat is present in an amount of from about 35 to about 40% by weight.

14. The cheese flavored confection composition of claim 10 wherein said lecithin is present in an amount of from about 0.4 to about 0.8% by weight.

15. The cheese flavored confection composition of claim 9 wherein said powdered dry cheese and said fat are simultaneously refined in a three-roll refiner.

16. The confection composition of claims 9 having a MacMichael viscosity at 102°–105° F. of about 20°–150°.

17. A method for preparing a cheese flavored confection composition comprising, blending about 10–60% powdered dry cheese powder with about 25–40% of a friable particulate, carbohydrate, and/or protein filler, said carbohydrate being selected from the group consisting of monosaccharide, disaccharide, and hydrolyzed starch; said protein being selected from the group consisting of dry milk, vegetable protein, and caseinate.

melting about 20–60% of a fat which has a Wiley Melting Point in the range of about 84°–120° F., as determined by AOCS method Cc2-38, an approximate solid fat index, as determined by AOCS method Cd10-57, of more than about 40 at 80° F. and less than about 35 at 92° F.

refining and conching said blend with said fat whereby the cheese particles of said powder are coated with said fat, and allowing the resulting combination to cool in the desired configuration;

said percentages being based on total composition weight.

18. The method of claim 17 wherein lecithin is included in said fat during said melting step thereby facilitating said coating of said cheese particles.

19. The method of claims 17 wherein said processed combination has a MacMichael viscosity at 102°–105° F. of about 20°–150°.

20. A conched, hard, glossy, non-grainy, cheese-flavored, confection-like coating having the flavor and texture of a hard cheese but being capable of storage under ambient conditions, consisting essentially of, on a dry weight basis;

a flavoring amount of about 10–60% dried cheese powders;

about 20–60% of a hard butter matrix having a Wiley Melting Point in the range of about 84°–120° F., as determined by AOCS method Cc2-38 and an approximate solid fat index, as determined by AOCS method Cd10-57 of more than about 40 at 80° F. and less than about 35 at 92° F.;

about 0.4–0.8% lecithin;

an effective amount of a gloss-forming emulsifier;

the remainder being particulate filler, said coating having a moisture content of less than about 3.5%;

said cheese powders and particulate filler being uniformly dispersed in the hard butter matrix;

said particulate filler being a carbohydrate, a protein, or combination thereof; said carbohydrate being selected from the group consisting of lactose, whey, sucrose, fructose and hydrolyzed starch; said protein being selected from the group consisting of dry milk vegetable protein and caseinate.

* * * * *